United States Patent [19]

Bielfeldt

[11] Patent Number: 4,505,661
[45] Date of Patent: Mar. 19, 1985

[54] INJECTION PRESS

[75] Inventor: Friedrich B. Bielfeldt, Eppingen-Muehlbach, Fed. Rep. of Germany

[73] Assignee: Maschinenfabrik J. Dieffenbacher GmbH & Co., Eppingen, Fed. Rep. of Germany

[21] Appl. No.: 416,705

[22] Filed: Sep. 10, 1982

[30] Foreign Application Priority Data

Sep. 14, 1981 [DE] Fed. Rep. of Germany ....... 3136419

[51] Int. Cl.$^3$ ............................................... B29C 1/00
[52] U.S. Cl. ................................ 425/190; 264/328.1; 425/542; 425/568; 425/571; 425/586; 425/DIG. 227
[58] Field of Search ................. 425/190, 542, 568–573, 425/564, DIG. 227, 555, 561, 562, 586; 264/328.1, 328.2, 328.4, 328.7

[56] References Cited

U.S. PATENT DOCUMENTS 3,985,486 10/1976 Hendry ............................... 425/564

Primary Examiner—Jay H. Woo
Assistant Examiner—Timothy W. Heitbrink
Attorney, Agent, or Firm—Jeffery, Schwaab, Mack, Blumenthal & Koch Schwartz

[57] ABSTRACT

An injection press for forming a mass of plastic material to a desired shape comprising a die carrier plate for supporting a mold having an injection channel formed therein at a location corresponding substantially to the location of the optimum injection point, said die carrier plate having a plurality of bores therethrough arrayed in an X-Y coordinate field; a press plate parallel to said die carrier plate and having a plurality of bores therethrough aligned with the bores in said die carrier plate in said X-Y coordinate field; means interposed between said die carrier plate and said press plate for injecting plastic material into a mold; a closing rod extendable through a pair of aligned bores in said die carrier plate and said press plate, through said interposed injecting means and through the injection channel of a mold on said die carrier plate to force plastic material into the mold; said injection means and said closing rod being selectively positionable in said X-Y coordinate field so that the closing rod will pass through a selected pair of aligned bores in said die carrier plate and said press plate corresponding to the location of the injection channel of a mold on said die carrier plate.

11 Claims, 5 Drawing Figures

INJECTION PRESS

BACKGROUND OF THE INVENTION

The present invention relates to an injection press for forming a mass of plastic material to a desired shape. More particularly, the present invention relates to an injection press which is adaptable to inject the plastic material to be molded into an irregularly shaped mold at a desired, eccentrically positioned injection point.

For injection molding of thermosetting masses, particularly synthetic resins, injection presses or injection molds are known in which the point of injection is located centrally of the mold or die carrier plate. This constitutes a technical disadvantage, however, when unsymmetrical molded parts are to be produced, since the projected center of surface of such parts is always outside the centrally loacted point of injection.

SUMMARY OF THE INVENTION

Accordingly, it is the object of the present invention to provide an improved injection press for forming a mass of plastic material to a desired shape.

A further object of the present invention is to provide an injection press which is adaptable to inject the plastic material into the mold or die at the most favorable point of injection for each part being formed.

Another object of the present invention is to provide an injection press which can inject the plastic material to be formed into the mold or die at a point which substantially corresponds to the projected center of surface of the part being formed.

It is also an object of the present invention to provide an injection press which is particularly well suited for forming unsymmetrical shapes.

These and other objects of the invention are achieved by providing an injection press for forming a mass of plastic material to a desired shape comprising a die carrier plate for supporting a mold or die having an injection channel formed therein at a desired injection point, said die carrier plate having a plurality of bores therethrough arrayed in an X-Y coordinate field; a press plate parallel to said die carrier plate and having a plurality of bores therethrough aligned with the bores in said die carrier plate in said X-Y coordinate field; means interposed between said die carrier plate and said press plate for injecting plastic material into a mold; a closing rod extendable through a pair of aligned bores in said die carrier plate and said press plate, through said interposed injecting means, and through the injection channel of a mold on said die carrier plate to force plastic material into the mold; said injection means and said closing rod being selectively positionable in said X-Y coordinate field so that the closing rod will pass through a selected pair of aligned bores in said die carrier plate and press plate most closely corresponding to the location of the desired injection point of a mold on said die carrier plate.

By using an injection press designed and constructed according to the presently claimed invention, any unsymmetrical molded part having a center of surface which is located away from the center of the die carrier plate of the press can be produced with the material to be molded injected substantially at the most favorable point of injection. This is made possible by the array of bores through the die carrier plate and press plate in the X-Y coordinate field through which the closing rod for the mold may be passed. The injection press of the invention has the further advantage that the flow behavior and the filling of the mold with the injected material is carried out in an optimum manner because the injection is effected at the most favorable point of injection, thereby improving the quality of the finished molded parts.

In a further preferred aspect of the invention, the end of the closing rod is extended to a point flush with the mold surface and constitutes a part of the mold surface so that a flashing-free molded part will be produced.

In yet another preferred aspect of the invention, the closing rod is provided with an individual drive system comprising a drive plate, guide means for said drive plate, and a hydraulic cylinder means for raising and lowering said drive plate.

In a still further preferred aspect of the invention, the guide means for the closing rod drive plate simultaneously function as supporting elements for suspending the drive plate hydraulic cylinder means.

BRIEF DESCRIPTION OF THE DRAWINGS

The invention will be explained in further detail with reference to the accompanying drawings wherein.

DETAILED DESCRIPTION OF PREFERRED EMBODIMENTS

Figure 3:
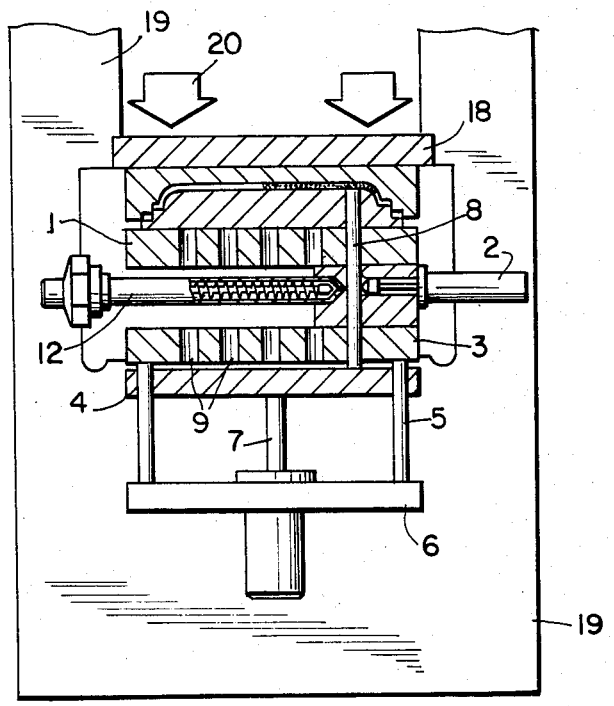
FIG. 3 is a schematic representation of the injection press of FIGS. 1 and 2 after the closing rod has been extended through the injection channel and the plastic material has been forced into the mold.

As can be seen particularly from FIG. 3, the main parts of the injection press comprise a press frame 19, a die carrier plate 1 with a lower mold member 16 thereon, a raiseable and lowerable press transom 18 with an upper mold member 15 thereon, and means for raising and lowering the transom and upper mold member, preferably a hydraulic cylinder and piston, represented by arrows 20. An injection means comprising a plasticizing screw conveyor 12 and an injecting device 2 is disposed underneath the mold between the die carrier plate 1 and a further press plate 3 parallel to the die carrier plate. The injection means is displaceable and can be secured in any desired position between die carrier plate 1 and press plate 3. A plurality of spacers 22 may also be disposed between die carrier plate 1 and press plate 3 to assure that proper clearance is maintained for the injecting means.

Figure 5:
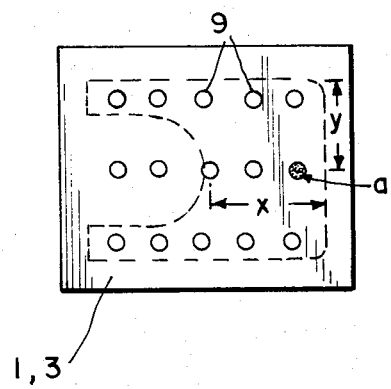
FIG. 5 is a plan view of the die carrier plate of the injection press of FIGS. 1-4.

A plurality of bores 9, disposed in an array in an X-Y coordinate field, are provided through die carrier plate 1 as seen more clearly from FIG. 5. A similar array of bores is provided through press plate 3, aligned with the array of bores through the die carrier plate, so that press plate 3 corresponds in appearance to die carrier plate 1 as shown in FIG. 5.

An injection channel 13 is formed through lower mold member 16 at a point aligned with the pair of aligned bores through die carrier plate 1 and press plate 3 which most closely corresponds to the optimum point of injection for the mold, represented by reference letter "a". In the illustrated embodiment, the unsymmetrical shape of the part being formed is represented by the dotted outline visible in FIG. 5. The optimum point of injection "a" is eccentrically positioned with respect to the center of the die carrier plate. A closing rod 8 can be extended through the pair of aligned bores in die carrier plate 1 and press plate 3 corresponding to the desired, eccentrically positioned injection point "a" to force plastic material from the injection means into the mold. The injection means comprising plasticizing screw conveyor 12 and injecting device 2 is moved between die carrier plate 1 and press plate 3 until the injection reservoir 11 thereof is aligned with the selected bores 9 in die carrier plate 1 and press plate 3 through which closing rod 8 is to be passed. Die carrier plate 1 and press plate 3 may be provided with any desired number of bores 9 arranged in an X-Y coordinate field as seen in FIG. 5.

The location of the optimum point of injection may be determined as follows. Initially, injection channel 13 is not formed in lower mold member 16. The mold is opened and an appropriate amount of a plastic material (for example a sauerkraut mixture or a cohesive clump of doughy material) is placed in the mold. The mold is then closed and the flow behavior of the plastic material is tested. By placing the plastic material at various locations on the mold and observing the flow behavior of the plastic material each time the mold is closed, the optimum point of injection can be determined empirically. Once the optimum point of injection has been found, the position of the injection channel 13 can be determined in alignment with the pair of aligned bores 9 through die carrier plate 1 and press plate 3 in the X-Y coordinate field which most closely corresponds to the desired point of injection. The injection channel 13 can then be formed in lower mold member 16, for example, in the position "a" as shown in the drawings.

Figure 1:
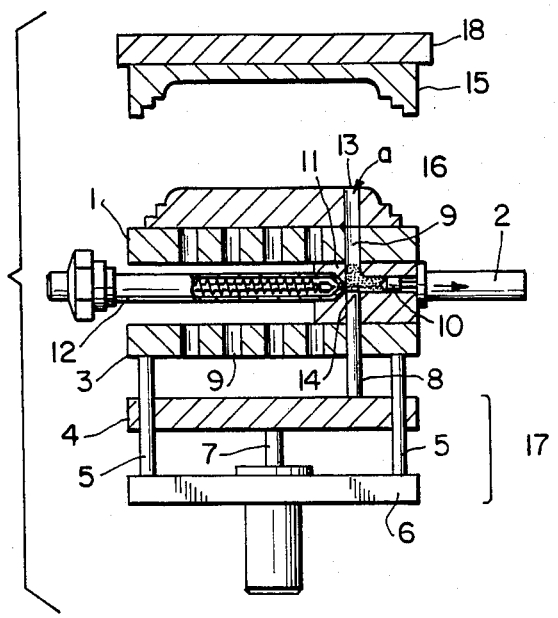
FIG. 1 is a schematic representation of an injection press according to the present invention with an open mold and a retracted closing rod.
Figure 2:
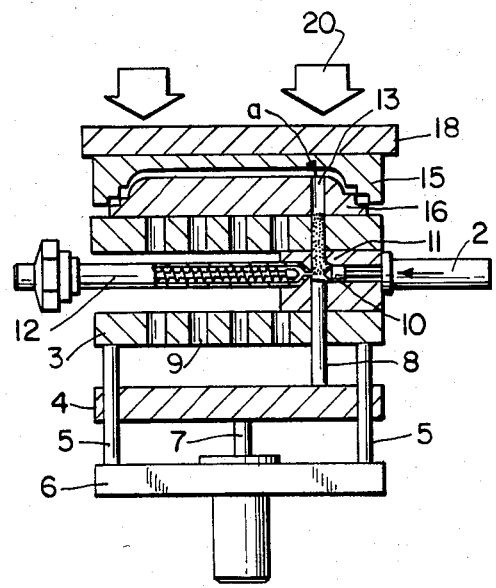
FIG. 2 is a schematic representation of the injection press of FIG. 1 with the mold closed and the injection channel of the mold charged with plastic material to be injected.

The injection sequence proceeds as follows. The required amount of material to be injected is conveyed to injection reservoir 11 by the injection means. An exact, premeasured amount is provided by the injection piston 10 of injecting device 2. The mold is substantially closed as shown in FIG. 2. When an edge insertion mold is used, the mold is not completely closed. Instead, it is only closed to a point where the inserted edges are laterally closed off. Depending upon the amount of plastic material to be injected into the mold, some plastic material may be forced into the quasi closed mold by piston 10 of injecting device 2. The remainder of the material to be injected is forced into the mold by extending closing rod 8 through the selected bore 9 in press plate 3, through injection reservoir 11 in the injecting means, through the selected bore 9 in die carrier plate 1, and through injection channel 13 in lower mold member 16, whereby injection channel 13 is closed.

The end surface 14 of closing rod 8 is extended to a point flush with the surface of lower mold member 16 so that rod end surface 14 constitutes a part of the mold surface.

Closing rod 8 is extended and retracted by a drive system 17 in which closing rod 8 is supported on a drive plate 4. Drive plate 4 is moved upwardly and downwardly by hydraulic cylinder 7. Drive plate 4 is guided by a number, e.g. 2 or 4, of guide rails 5. The guide rails 5 simultaneously serve as load bearing elements for suspending the crosspiece 6 upon which hydraulic cylinder 7 is mounted.

Figure 4:
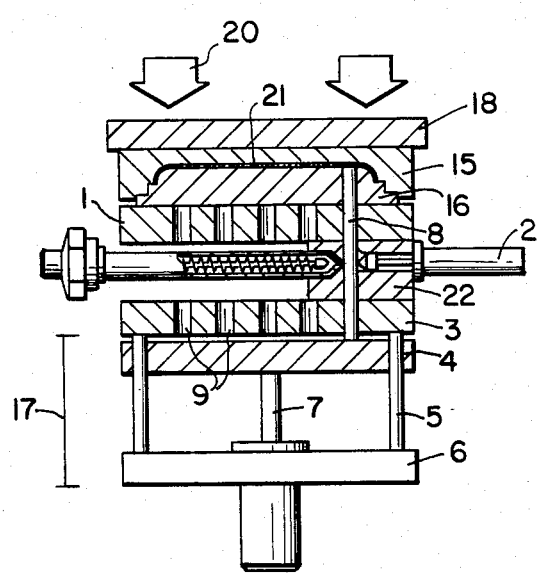
FIG. 4 is a schematic representation of the injection press of FIGS. 1-3 during pressing of the molded part.

After the plastic material has been injected, the mold is completely closed as shown in FIG. 4 and subjected to the pressure of the press closing means 20.

The injection press of the invention is particularly suited for forming a mass of a thermosetting material to a desired shape. Suitable thermosetting materials include thermosetting synthetic resins such as phenolic resins, melamine resins and thermosetting polyester resins. If desired, the mass of plastic material may be reinforced with glass fibers. In order to complete hardening of such resins, mold members 15 and 16 may be provided with heating means as is known in the art.

As a result of the unique design and construction of the injection press of the invention, it can be seen that a press has been provided which is capable of injecting plastic material into a mold at a variety of injection points disposed at various locations in an X-Y coordinate field so that plastic material can be injected through an eccentrically positioned injecting channel in a mold located at a point which at least substantially corresponds to the optimum point of injection.

The foregoing description has been set forth merely to illustrate a preferred embodiment of the invention and is not intended to be limiting. Since modifications of the disclosed embodiment incorporating the spirit and substance of the invention may occur to persons skilled in the art, the scope of the invention is to be limited solely with respect to the appended claims and equivalents.

I claim:

1. An injection press for forming a mass of plastic material to a desired shape comprising:

a die carrier plate for supporting a mold having an injection channel formed therein at a desired injection point, said die carrier plate having a plurality of bores therethrough arrayed in an X-Y coordinate field;

a press plate parallel to said die carrier plate and having a plurality of bores therethrough aligned with the bores in said die carrier plate in said X-Y coordinate field;

injecting means interposed between said die carrier plate and said press plate for injecting plastic material into a mold, said injecting means comprising a single injection nozzle;

a closing rod extendable through a desired pair of aligned bores in said die carrier plate and said press plate, through said interposed injecting means and through the injection channel of a mold on said die carrier plate to force plastic material into the mold;

said injection means and said closing rod being selectively positionable in said X-Y coordinate field so that the closing rod will pass through a selected, desired pair of aligned bores in said die carrier plate and said press plate most closely corresponding to the location of the desired injection point of a mold on said die carrier plate.

2. An injection press according to claim 1, wherein said die carrier plate supports the lower mold member of a mold comprising upper and lower mold members, and a raiseable and lowerable transom is provided for supporting the upper mold member of said mold.

3. An injection press according to claim 1, wherein said desired injection point is eccentrically positioned away from the center of the die carrier plate.

4. An injection press according to claim 1, wherein said closing rod is raiseable and lowerable by means of a drive system comprising a drive plate upon which said rod is supported, means for guiding said drive plate and a hydraulic cylinder for raising and lowering said guide plate.

5. An injection press according to claim 4, wherein said guide means comprises a plurality of guide rods which simultaneously serve as load bearing members for supporting a crosspiece upon which said hydraulic cylinder is mounted.

6. An injection press according to claim 1 further comprising spacer means disposed between said die carrier plate and said press plate for maintaining a desired clearance between said plates for said injecting means.

7. An injection press according to claim 1, wherein said injecting means comprises a plasticizing screw conveyor, an injection reservoir and an injection device.

8. An injection press according to claim 1, wherein the end face of said closing rod is extended flush with the mold surface of a mold on said die carrier plate, and said closing rod end face serves as a part of the mold surface.

9. An injection press according to claim 1, wherein said plastic mass comprises a thermosetting synthetic resin, and said press further comprises means for heating a mold in said press to harden said resin.

10. An injection press according to claim 9, wherein said resin is selected from the group consisting of thermosetting phenolic resins, thermosetting melamine resins, and thermosetting polyester resins.

11. An injection press according to claim 1, wherein said plastic mass is reinforced with glass fibers.

* * * * *